United States Patent [19]

Goldberg

[11] Patent Number: 4,604,309

[45] Date of Patent: Aug. 5, 1986

[54] FOOD CASING WHICH WILL TRANSFER A SMOKE COLOR TO FOOD ENCASED THEREIN AND EXTRACTED NATURAL LIQUID SMOKE COLORANT FOR USE THEREWITH

[75] Inventor: Michael S. Goldberg, Danville, Ill.

[73] Assignee: Teepak, Inc., Oak Brook, Ill.

[21] Appl. No.: 379,795

[22] Filed: May 19, 1982

[51] Int. Cl.$^4$ .................. A22C 13/00; A23L 1/22
[52] U.S. Cl. .................. 428/36; 138/118.1; 426/105; 426/135; 426/250; 426/314; 426/316
[58] Field of Search .................. 138/118.1; 428/36; 426/105, 135, 250, 314, 316

[56] References Cited

U.S. PATENT DOCUMENTS

| | | | |
|---|---|---|---|
| 2,301,564 | 10/1942 | Menges | 426/135 |
| 2,477,767 | 8/1949 | Remer | 426/135 |
| 2,477,768 | 8/1949 | Remer | 426/135 |
| 3,117,007 | 1/1964 | Hollenbeck | 426/1.35 |
| 3,330,669 | 7/1967 | Hollenbeck | 426/135 |
| 3,467,527 | 9/1969 | Wistreich | 426/135 |
| 3,523,802 | 8/1970 | Wandel et al. | 426/314 X |
| 3,932,676 | 1/1976 | Janicki et al. | 426/250 |
| 4,104,408 | 8/1978 | Chiu | 426/135 |
| 4,171,381 | 10/1979 | Chiu | 426/105 |
| 4,196,220 | 4/1980 | Chiu et al. | 426/105 |
| 4,278,694 | 7/1981 | Chiu | 426/135 |

OTHER PUBLICATIONS

Red Arrow Products Technical Directory, Section I, pp. 1–14, Product Line Directory.

*Primary Examiner*—John E. Kittle
*Attorney, Agent, or Firm*—William J. Crossetta; Michael L. Dunn

[57] ABSTRACT

The invention relates to the solvent extraction of smoke colorant from natural liquid smoke. In accordance with the invention, the known acidic liquid smokes which are formed by contacting burning wood smoke with water are neutralized to separate tarry materials and form neutral storage stable liquid colorants which are capable of passing through regenerated cellulose sausage casings during cooking to color the meat and further do not cause deterioration of the casing during storage.

20 Claims, No Drawings

4,604,309

FOOD CASING WHICH WILL TRANSFER A SMOKE COLOR TO FOOD ENCASED THEREIN AND EXTRACTED NATURAL LIQUID SMOKE COLORANT FOR USE THEREWITH

TECHNICAL FIELD

The present invention relates, generally, to bags or casings for artificially-colored food stuffs. It particularly relates to regenerated cellulose casings, for forming wieners, hams, sausages, bologna and other similar meat products that have been impregnated either before or after being filled with uncooked meat products with a colorant containing an extract of liquid smoke.

BACKGROUND ART

It has been known in the art related to treatment of sausage products to artificially impart smoke flavor to frankfurters and other sausage products. While several methods have been proposed in the past for imparting smoke color to frankfurters, it is believed that, in addition to the use of the natural smoke of burning wood, there presently are two methods in commercial use. In both of these, natural-liquid smoke is utilized rather than dye. The liquid smokes are derived from recovery of smoke from burning wood by scrubbing of the smoke with water. In one of these, the stuffed frankfurters are exposed to an atmosphere saturated with vapor phase smoke or in the second alternative the frankfurters are sprayed with a liquid smoke or dipped in a bath containing liquid smoke. While these processes are successful, there are certain economic disadvantages. There is a need for a reduced cooking cycle time, reduced labor cost and increased consistency of color development. Further, there are some meat batters difficult to color with vapor phase or liquid smoke.

Further, it has been known to color frankfurters by use of a transfer casing which has been impregnated with Red 40 or Yellow 6. However, such frankfurters only have limited appeal in that the red frankfurters are only widely sold in the Southeastern U.S. and the Yellow 6 colored (orange) frankfurters are only widely sold in some areas of the Southwestern U.S. Attempts have been made to color frankfurters with combinations of legal Food and Drug Administration approval colors (FD&C colors). However, these colors have been found to differentially diffuse into frankfurters with a result in changes in color within a few days of refrigerator storage and the frankfurter usually takes the surface color of the slowest diffusing component within a few days.

U.S. Pat. Nos. 4,104,408, 4,171,381, 4,196,220, 4,216,574 and 4,278,694 to Chiu are directed to various means of coating food product casings with colorant and/or flavoring material. They are primarily directed to interior coating rather than exterior. Interior coating is difficult for small diameter casings as there is no way to efficiently patch the small casings where the coating slugs are inserted and removed and it significantly increases labor costs. Further, interior coating methods have difficulty in that when the casing is shirred, the colorant tends to pool in the open loops of the pleats. The liquid smoke derived colorants of U.S. Pat. Nos. 4,196,220 and 4,278,694 are not believed suitable for exterior coating with penetration of the coating to the meat product therein.

There remains a need for an improved system of coloring for applying smoke color to encased meat products such as sausages, bologna, salami, hams and frankfurters. There is a need for a smoke color that will transfer from casing to meat batter during cooking and remain on the surface of the meat batter after the casing is removed. There is a need for a smoke color which will not bleed excessively or change color when the sausage is reheated. There is a continuing need for a smoke colorant which may be applied to unstuffed casings, from the outside, at normal production line speeds, without any more labor than attended to a casing dyed with a food color such as Yellow 6 or Red 40. There also is a need for a smoke color which will be evenly distributed on the meat product surface whereas those coated by vapor phase smoke may show marks from where the meat rested on the support stick or was in contact with other frankfurters. Further, there is a need for a colorant which may be applied to the outside of a casing which is stable during the shirring process. There is a further need for an improved colorant which will not interfere with any food casing processing subsequent to its application to the casing such as drying, reeling, shirring, stuffing, linking or peeling and which further will contain a colorant which will have sufficient shelf life for commercial distribution.

DISCLOSURE OF THE INVENTION

It is an object of this invention to overcome smoke colorant difficulties of the prior art.

It is an additional object of this invention to create a smoke colorant that can be applied to the exterior of food casings and color meat cooked therein.

It is an additional object of this invention to provide uniform smoke colored meat products.

It is an additional object of this invention to create a storage stable smoke colorant impregnated food product casing.

It is another further object of this invention to provide a colorant that can be rapidly applied to food products.

These and other objects of the invention have generally been accomplished in accordance with the invention by the extraction of smoke colorant from natural liquid smoke. In accordance with the invention, the known acidic liquid smokes which are formed by contacting burning wood smoke with water are neutralized to separate tarry materials. The liquid remaining after neutralization and removal of tarry materials forms neutral storage stable liquid smoke colorants which are capable of passing from impregnated regenerated cellulose sausage casings during cooking to color the meat. Further, the colorants of the invention do not cause excessive deterioration of the casing during storage.

In a preferred form of the invention, a conventional acidic liquid smoke is extracted three times in organic solvent, the aqueous extractant is neutralized and then the neutralized aqueous solution is extracted an additional time and then may optionally be evaporated to be concentrated.

In another preferred form, the conventional acidic liquid smoke is neutralized, the tarry precipitate separated from the supernatant liquid utilized as recovered or it may be optionally extracted once with a solvent.

The neutralized liquid smoke recovered from either process may be concentrated if desired. The invention produces low odor colorants than when applied to a regenerated cellulose casing will color meat products cooked therein and allow the casing to be stored for a reasonable shelf life prior to stuffing and use.

MODES FOR CARRYING OUT THE INVENTION

The invention has numerous advantages over prior processes. The invention provides a system for providing a smoke coloring to sausages, particularly skinless frankfurters, in a way which has heretofore not been possible. The invention allows for uniform application of color to the sausage. Further, the shelf life of the colored frankfurters is long and the shelf life of the colored casing prior to filling with meat product also is sufficient to allow commercial distribution. The invention smoke color is suitable for application to unstuffed casings prior to drying at normal production line speeds without any more labor than required in known methods of dying with FD&C approved colorants such as Red 40 and Yellow 6. The colorant of the invention does not leave shadows caused by smoke sticks or contact with other frankfurters during cooking. There is no need in the invention for the slow production speeds and difficult patching of the casing involved in slug coating of the interior surface of small diameter casings. Additionally, the colorant is suitable for slug impregnation of large diameter casings and the fibrous reinforced casings. The colorants of the invention remarkably color the sausage product in a uniform and pleasing manner when the colorant is applied to the outer surface of the casing by dip or spray in the gel state of the casing prior to drying and storage or applied to the outer surface of the cased frankfurter after it is stuffed with uncooked meat but is treated with the colorant prior to cooking. These and other advantages of the invention will be clear from the full description given below.

While it has been known that the smoke colorants derived from the burning of wood materials as above described need to be maintained at acid pH and are difficult to maintain at neutral pH without the addition of other materials such as alcohols, it has surprisingly been discovered that a colorant fraction of the natural liquid smokes could be separated and easily maintained at a neutral pH without the addition of additives to the solution. This is especially important in this case as the use of alcohol or other additives to stabilize the colorant is another food additive. As is well known, there is a desire to minimize the addition of food additives during processing and, therefore, colorants without additives are desirable. The invention provides a colorant formed substantially of natural smoke ingredients which is of neutral pH which makes possible the formation of storage stable regenerated cellulose color impregnated casings.

It has surprisingly been found that a large portion of the tar-like materials of conventional natural smoke colorings and flavorings which are removed are not necessary for the smoke color when processed in the invention. The colorant of the invention may be substantially tasteless on meat products or can be processed to leave taste by making fewer solvent extractions. The smoke taste, if a strong smoke taste is desired when using the invention, is generally added to the meat product by known methods prior to stuffing of the casing. Prior efforts were believed focused on preserving the tar materials that precipitate in neutral solutions in the natural smokes. This has been found to be not necessary for formation of a colorant. The materials which are removed during neutralization and solvent extraction are surprisingly not necessary for color and apparently primarily add flavor.

Smoke coloring constituents suitable for use in preparing the colorant of the present invention are generally those designated as being the coloring and flavoring constituents of "liquid smoke" which is a well known class of materials also commonly referred to as "liquid smoke solutions." Various "liquid smokes" are known, all of which are believed suitable for use in the present invention.

Liquid smoke often is a solution of natural wood smoke constituents prepared by burning a wood, for example, a hickory or a maple, and capturing the natural smoke constituents in a liquid medium such as water. Alternatively, the liquid smoke to be used may be derived from the destructive distillation of a wood, that is, the breakdown or cracking of the wood fibers into various compounds which are distilled out of the wood residue. Liquid smokes are generally very acidic, usually having a pH of 2.5 or less and a titratable acidity of at least 3%, although some partially neutralized liquid smokes, having a pH up to about 5, are also available. Reference to the term smoke coloring constituents, as used throughout this specification and in the appended claims with respect to the neutralized liquid smoke compositions and casings of the invention, is intended to refer to, and should be understood as referring to the smoke coloring and flavoring constituents and proportions thereof of undiluted liquid smoke solutions in their present commercially available form.

The liquid smoke that is preferred for use with this invention is a solution of natural wood smoke constituents. This liquid smoke is produced by the limited burning of hardwoods and the absorption of the smoke so generated into an aqueous solution under controlled conditions. The limited burning keeps some of the undesirable hydrocarbon compounds or tars in an insoluble form, thereby allowing removal of these constituents from the final liquid smoke. Thus, by this procedure, the desirable wood constituents are absorbed into the solution in a balanced proportion and the undesirable constituents may be removed. The resultant liquid smoke solution is representative of the whole preferred spectrum of smoke colors and flavors without a preference of any one type. The apparatus and method for manufacturing typical liquid smokes of the preferred type is more fully described in U.S. Pat. Nos. 3,106,473 to Hollenbeck and 3,873,741 to Melcer et al.

Certain liquid smokes have been approved for use in foods by the U.S. Food and Drug Administration and the Meat Inspection Division of the U.S. Department of Agriculture. Exemplary of suitable commercially available liquid smokes are CHARSOL from Red Arrow Products Co., Manitowoc, Wis.; LIQUID HICKORY SMOKE from Hickory Specialties, Inc.; GRIFFITHS'S NATURAL SMOKE FLAVOR from Griffith Laboratories Inc.; and SMOKAROMA LIQUID SMOKE CODE 10 from Meat Industry Suppliers, Inc.

Generally in accordance with the invention, there have been several methods of extraction of the colorant of the invention from conventional liquid smoke solutions. Conventional liquid smoke solutions are very acidic and, therefore, do not lend themselves to coating of regenerated cellulose food casings which are to be stored. The acidic constituents of the liquid smoke break down the casings in a short time. One preferred method of the invention is to provide a conventional liquid smoke solution, combine the liquid smoke solution with an effective amount of an organic solvent such as methylene chloride or diethyl ether, agitate the mixture of liquid smoke and solvent, then allow the mixture to separate as they are immiscible. After separation, the aqueous portion is drawn off and again combined with an effective portion of solvent, agitated and allowed to settle prior to drawing off the aqueous portion. After the second extraction, the aqueous portion is neutralized to a pH of between 6 and 8 utilizing a base such as sodium hydroxide. It is noted that during the agitation of the liquid smoke with the methylene chloride or diethyl ether tar-like deposits are extracted by solvent. After neutralization, the aqueous is again extracted using the organic solvent. The aqueous phase is then suitable for use as a colorant. The aqueous phase may be concentrated by conventional means such as a rotary evaporator.

In a second extraction method, the conventional liquid smoke is neutralized with a base such as sodium hydroxide to a pH of 6 to 7. This neutralization causes tar to precipitate. The tar-like deposits may be separated by centrifuging and pouring off the liquid. Filtering may also be used for separation. The liquid which is poured off may then be used as a colorant as it is or may be extracted by combination with an effective volume of organic solvent, agitation and allowing the organic solvent such as diethyl ether or methylene chloride to naturally separate prior to drawing off the aqueous portion. The aqueous portion then is suitable for use as a colorant for food products or may be concentrated in a darker color is desired with the same coating level being applied.

Any water soluble alkaline neutralizing agent may be used in accordance with the invention. Typical of water soluble alkaline materials are potassium hydroxide, sodium carbonate, sodium bicarbonate, sodium phosphate, disodium hydrogen phosphate, trisodium phosphate and combinations thereof. A preferred material for utilization in the invention has been found to be sodium hydroxide at high concentrations as this provides good neutralization without increasing the aqueous bulk of the extract significantly.

Any separation and agitation apparatus may be utilized for the mixing of the solvent with the smoke colorant and the extraction of the aqueous portion. On a laboratory scale a suitable device has been found to be a separatory funnel as this may be filled, shaken up and then after settling the lower fraction drawn off.

The solvent utilized for extraction may be any solvent which provides good separation of the precipitating materials while leaving the colorant components in the aqueous phase. Typical of suitable solvents are the halogenated hydrocarbons and the ethers. Suitable for the invention are the chlorine substituted hydrocarbon solvents. Preferred among the organic solvents are diethyl ether, chloroform and 1,2-dichloro-ethane as these materials provide good extraction, easy separation by immiscible phases and good colorant separation. A particularly preferred solvent is methylene chloride because of its acceptance in food product processing.

A step in performance of the process necessarily comprises neutralization with an alkaline material. The process also generally comprises the solvent extraction of the supernatant liquid formed during neutralization. The particular order in which the steps of neutralization and extraction are performed and the multiplicity of times the extraction is performed is dependent upon the particular liquid smoke which is the starting material, the purity of the product desired, and the effectiveness of the solvent, and solvent amount used.

In one separation technique that has been found to be preferred the conventional liquid smoke is twice extracted with solvent. In these extractions, the liquid smoke is mixed with an effective amount of solvent, shaken up, allowed to settle and the aqueous phase drawn off. After the second extraction, the aqueous phase is neutralized to a pH of between about 6 and about 8 with an alkaline material such as sodium hydroxide. After neutralization, the solution is again extracted with the solvent and the aqueous phase separated. The aqueous phase then may be used as is or may be concentrated by evaporation by means such as a rotary evaporator.

In a second preferred process, the conventional commercial liquid smoke is first neutralized with a alkaline material such as 50 percent sodium hydroxide to a pH of between about 6 and about 8. During this neutralization, a heavy tar is precipitated. The precipitate is concentrated and separated by centrifuging and then drawing off the neutralized liquid. The neutralized liquid drawn off after separation is extracted preferably by a combination with an effective volume of a solvent, such as diethyl ether or methylene chloride, and agitation with the solvent. After agitation, the solvent and the aqueous phase are allowed to separate and the aqueous phase is drawn off. This aqueous phase may be used as is or may be concentrated by evaporative techniques.

In a third preferred process, the conventional commercial liquid smoke is first neutralized with an alkaline material such as 50 percent sodium hydroxide to a pH of between about 6 and about 8. During this nuetralization, a heavy tar is precipitated. The precipitate is concentrated and separated by centrifuging and then drawing off the neutralized liquid. The neutralized liquid drawn off after separation is used as is without extraction. This process is preferred as it leaves some smoke flavor and does not leave residual solvent in the smoke colorant.

The colorant of the invention may be applied to casing material by any suitable impregnation technique. Typical of such coating and impregnation techniques are slug coating, spraying and dipping. A preferred method of impregnation is dipping when the regenerated cellulose casing is in the gel state as only one drying step needs to be performed if dipping is done in the gel state. The gel state is the state of the casing immediately prior to being dried and sized. The casing after dip coating, drying and sizing is capable of applying a pleasing smoke color to a sausage product which is stuffed and cooked therein. The colorant while externally coated passes through the regenerated casing during cooking and is deposited on to the meat product. It is also within the invention to utilize the colorant of the invention for dip coating of a casing after it has been filled with a processed meat product but prior to cooking. Further, while described with particular reference to the use with strippable casings it is also within the invention to utilize the invention colorant for edible casing products.

Any known food casing material may be used with the colorant of the invention. Typical of such food casing materials are nylon, polyester, polyvinyl alcohol, polyacetate and amylose. Casings believed suitable for the invention are natural casings, collagen and fibrous regenerated cellulose reinforced with cellulose paper or other reinforcing material with or without barrier coating. A preferred food casing is strippable regenerated cellulose as it is widely used, easily impregnates by dipping and transfers well to give pleasing smoke color to the meat material during cooking. Some of the other casing materials may be less permeable and must have the colorant of the invention applied to the interior of the casing; likewise, the colorant may be applied to the interior and the exterior of the casing when needed.

Other ingredients which are normally used in the manufacturing and/or further treatment of food product casings may also be combined with the colorant of the invention. Preferred additives for utilization with the colorant system of the invention are glycerin, propylene glycol and mixtures thereof which act as plasticizers for the casing and may be added in amounts up to about 10 percent by weight of the aqueous colorant.

The amount of the smoke colorant of the invention which is to be applied to a food casing depends on the desired color characteristics to be imparted to the food product processed therein. The amount may vary widely depending on the size of the casing, thickness of the casing, type of food product to be colored and concentration of the colorant material when applied to the casing.

The solvent extracted smoke colorants of the invention are of any pH desired for a particular application. For storage properties, it is suitable that the pH be adjusted to between about 6 and about 8. A preferred pH is between about 7 and about 8 because the casing is most stable at this pH. After the pH has been adjusted by neutralization with the sodium hydroxide further solvent extraction does not significantly change the pH.

The food casings of the invention may be provided in any of the forms known. Typical of such forms are discreet short segments of flattened casings and continuous lengths of flattened casings on a reel. A preferred form is shirred casing sticks as the colorant of the invention provides particular advantage in that the exterior coating does not allow the colorant to settle in the creases of the stick and is storage stable allowing the distribution and storage of sticks which will be filled with meat products by conventional machinery.

The following examples are intended to be illustrative of the invention but not exhaust all possibilities. Parts and percentages are by weight unless otherwise indicated. Temperatures are in Fahrenheit unless otherwise indicated.

EXAMPLE I

About 100 milliliters of natural hickory liquid smoke (CHARSOL H10 from Red Arrow Products Co., Manitowoc, Wis.) was extracted three times. This was accomplished by placing the 100 milliliters of liquid smoke into a 500 milliliter separatory funnel. There was then added about 100 milliliters of diethyl ether. The mixture was then shaken up and allowed to separate by settling for approximately ten (10) minutes. After settling, the aqueous phase was drawn off through the funnel leaving the ether in the separatory funnel. The separated ether was then discarded. This was repeated. The aqueous phase after the second extraction was neutralized to a pH of about 7 with a solution of about 50 percent sodium hydroxide. The neutralized aqueous phase was then returned to the 500 milliliter separatory funnel and combined with an equal portion of new diethyl ether. This was agitated, allowed to settle and the aqueous portion withdrawn. Three foot lengths of casings were dipped in the liquid smoke fractions and hand stuffed. The frankfurthers were cooked in a commercial type smokehouse for 1½ hours at the normal frankfurter cooking conditions. The casing was stripped from the frankfurter, and it could be seen that a pleasing smoke color had been transferred to the hotdogs. After storage for about 60 days, the hotdogs were again observed and continued to maintain the pleasing smoke color.

EXAMPLE II

About 100 milliliters of natural hickory liquid smoke (CHARSOL H10 from Red Arrow Products Co., Manitowoc, Wis.) was neutralized with a 50 percent sodium hydroxide solution using a pH meter to bring the aqueous phase to the pH of about 7. At this point a precipitate had formed in the aqueous solution. The solution and precipitate were placed in 200 ml. bottles in a centrifuge and centrifuged at about 2000 r.p.m. for about one half hour. After centrifuging, the sample was removed and the aqueous phase poured off. The aqueous phase was placed in a separatory funnel of about 500 milliliters and also placed into the separatory funnel was about 100 milliliters of 1,2-dichloro-ethane. This was shaken to thoroughly mix the aqueous phase in the solvent. It was then allowed to separate and the solvent, in this case heavier than the water, was drawn off from the base of the separatory funnel. Aqueous phase was then removed from the funnel and concentrated by treatment with a rotary evaporator. The rotary evaporator was a flask which is rotated in a hot water bath and has a vacuum applied by a water aspirator to the flask. The aqueous phased we treated was concentrated by removal of about 25 percent by volume of the water. A casing length of about three feet was then passed through the aqueous solution while it was in a dip coater. The casing that had been in the gel phase during dipping was then dried, conditioned and hand stuffed with meat product for frankfurters. The frankfurters were cooked in a commercial type smokehouse for 1½ hours at the usual frankfurter cooking conditions. The casing was then stripped, and it could be seen that a pleasing smoke color had been achieved.

EXAMPLE III

The process of Example I was repeated except that chloroform was substituted for the ether solvent. This substitution made it necessary that the solvent be drawn off from the bottom of the separatory funnel rather than the aqueous phase. Satisfactory results were also achieved by the use of the chloroform solvent.

EXAMPLE IV

The process of Example I was repeated utilizing 1,2-dichloro-ethane as the solvent. This necessitated drawing off of the solvent from the bottom of the separatory funnel and removal of the aqueous phase from the top. This colorant also produced a pleasing smoke color which was storage stable.

EXAMPLE V

The process of Example II was repeated substituting chloroform for the 1,2-dichloro-ethane. This also was found to give a pleasing smoke color.

EXAMPLE VI

As received natural liquid smoke is neutralized to approximately pH 7 with sodium hydroxide solution (50 w/w percent was used). The action of sodium hydroxide on the liquid smoke causes a tarry material to separate which is settled out by centrifugation. The supernatant liquid is decanted off. At this point, the supernatant liquid is extracted once with an equal volume of diethyl ether or 1,2-dichlorethane. The remaining supernatant liquid is used as a casing dip liquid and is found to transfer a pleasing smoke color to a meat product through regenerated cellulose casings.

EXAMPLE VII

The process of Example VI is repeated except that the supernatant liquid is used as a casing dip without solvent extraction. A meat product is stuffed into the casing and cooked. The product has a pleasing color.

EXAMPLE VIII

The process of Example VI is repeated except the liquid is concentrated with a rotary evaporator.

EXAMPLE IX

About 100 milliliters of natural hickory liquid smoke (CHARSOL H10 from Red Arrow Products Co., Manitowoc, Wis.) was neutralized with a 50 percent sodium hydroxide solution using a pH meter to bring the aqueous phase to the pH of about 8. At this point a precipitate had formed in the aqueous solution. The solution and precipitate were placed in 200 ml. bottles in a centrifuge and centrifuged at about 200 r.p.m. for about one and one half (1½) hours. After centrifuging, the sample was removed and the aqueous phase poured off. The aqueous phase was placed in a dip coater. A casing length of three feet was impregnated by passing through the aqueous solution while it was in a dip coater. The casing that had been in the gel phase during dipping was then dried, conditioned and hand stuffed with meat product for frankfurters. The frankfurters were cooked in a commercial type smokehouse for one and one half (1½) hours at the usual frankfurter cooking conditions. After the casing was stripped, a pleasing smoke color was found on the frankfurter.

EXAMPLE X

The process of Example I was repeated substituting methylene chloride for the diethyl ether. A satisfactory product was obtained.

EXAMPLE XI

The process of Example II was repeated substituting methylene chloride for the 1,2-dichloro-ethane. A satisfactory product with pleasing smoke color was obtained.

The smoke colorant of the invention while herein described as utilized with food casing materials for food products also could, as would be obvious to one skilled in the art, be used in other food colorant processes. They could be mixed into food such as stews or gravys to provide color. They further could be applied directly to food by dipping or injected into foods such as hams, fish or fowl where a smoke color and possibly a light smoke flavor was desired.

In the foregoing specification, a complete description of the invention has been set forth. However, it will be apparent to those skilled in the art that modifications and variation may be made therefrom without departing from the spirit and scope of this invention which is limited only by the claims attached hereto. For instance, the specification generally referred to the stuffing of frankfurters. However, the invention naturally finds use in stuffing of other sausages which have need for smoke color. Further, it would be within the invention to combine the smoke colorant of the invention with other Food and Drug Administration approved colorants such as Yellow 6 to achieve different color variations. While described specifically with regard to regenerated cellulose casings, it also would be within the invention to color meat products in edible collagen casings or fibrous reinforced regenerated cellulose casings. Further, the coloring of the invention would find use in coloration of casings themselves in those instances in which sausages are sold in removable casings. These and other variations of the invention are intended to be included by the claims attached hereto.

What is claimed is:

1. A casing for meat products comprising a tube, impregnated with a colorant, said colorant formed by neutralizing an aqueous natural liquid smoke coloring solution, with a solution consisting essentially of water soluble alkaline neutralizing agent, to a pH of from about 6 to about 8 to precipitate a substantial portion of tar materials contained therein and removing said precipitated tar materials.

2. The casing of claim 1 wherein said casing is a tube and comprises regenerated cellulose.

3. The casing of claim 2 wherein said tube comprises fibrous reinforced regenerated cellulose.

4. The casing of claim 1 wherein the colorant is storage stable.

5. The casing of claim 1 wherein said colorant further comprises glycerin.

6. The casing of claim 1 having a pH of between about 7 and about 8.

7. The casing of claim 1 wherein said colorant is impregnated on the exterior and interior of said tube.

8. The casing of claim 1 wherein said colorant is derived from commercially available natural liquid smokes.

9. The casing of claim 1 wherein said colorant further comprises an FDA approved colorant.

10. The method of forming a storage stable regenerated cellulose casing which is capable of imparting a smoke color to a meat product cooked therein comprising providing a regenerated cellulose food casing and impregnating said casing with a neutralized natural smoke colorant formed by neutralizing an aqueous natural liquid smoke coloring solution, with a solution consisting essentially of water soluble alkaline neutralizing agent, to a pH of from about 6 to about 8 to precipitate a substantial portion of tar materials contained therein and removing said precipitated tar materials.

11. The method of claim 10 wherein said smoke colorant is extracted from aqueous natural smoke colorants by solvent extraction with an organic solvent and neutralized with an alkaline material.

12. The method of claim 10 wherein said neutralized smoke colorant has a pH of between about 7 and about 8.

13. The method of claim 10 wherein said colorant further comprises an element selected from the group consisting of propylene glycol, glycerin and mixtures thereof.

14. The method of claim 10 in which the colorant has been applied to the outside of the casing by dipping.

15. The method of claim 10 wherein said casing is shirred.

16. The method of claim 10 wherein said casing comprises fibrous reinforced regenerated cellulose.

17. A food product comprising a meat product the surface of which is colored by a neutralized natural liquid smoke colorant from a casing of claim 1.

18. The food product of claim 17 wherein said food product is a sausage, smoke colored during cooking.

19. The food product of claim 17 wherein said food product comprises a frankfurter.

20. The food product of claim 17 wherein said food product was cooked in a strippable casing comprising a neutralized solvent extracted natural liquid smoke colorant.

* * * * *

Notice of Adverse Decision in Interference

In Interference No. 101,872, involving Patent No. 4,604,309, M. S. Goldberg, FOOD CASING WHICH WILL TRANSFER A SMOKE COLOR TO FOOD ENCASED THEREIN AND EXTRACTED NATURAL LIQUID SMOKE COLORANT FOR USE THEREWITH, final judgment adverse to the patentees was rendered Jan. 10, 1989, as to claims 1-20.

[ *Official Gazette May 30, 1989* ]